F. N. COLE.
POTATO HARVESTER.
No. 185,627. Patented Dec. 26, 1876.
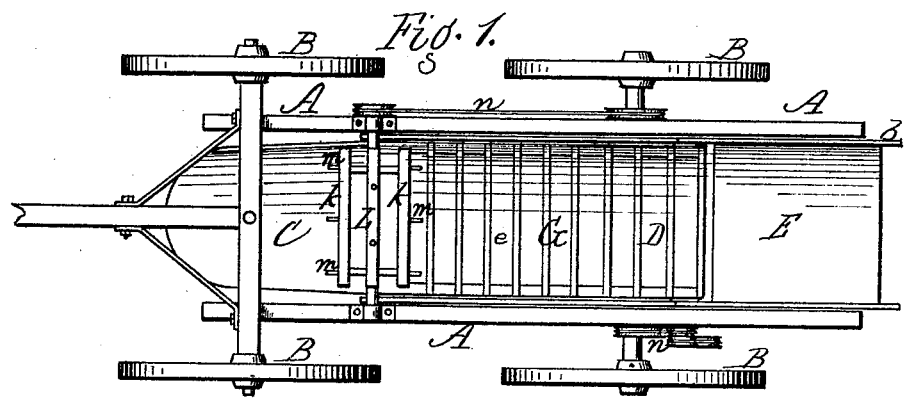
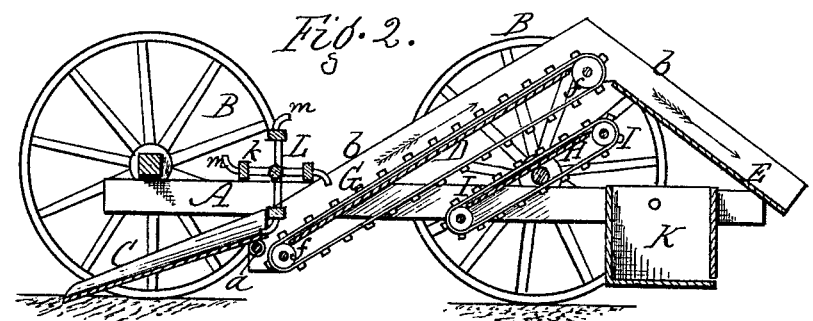
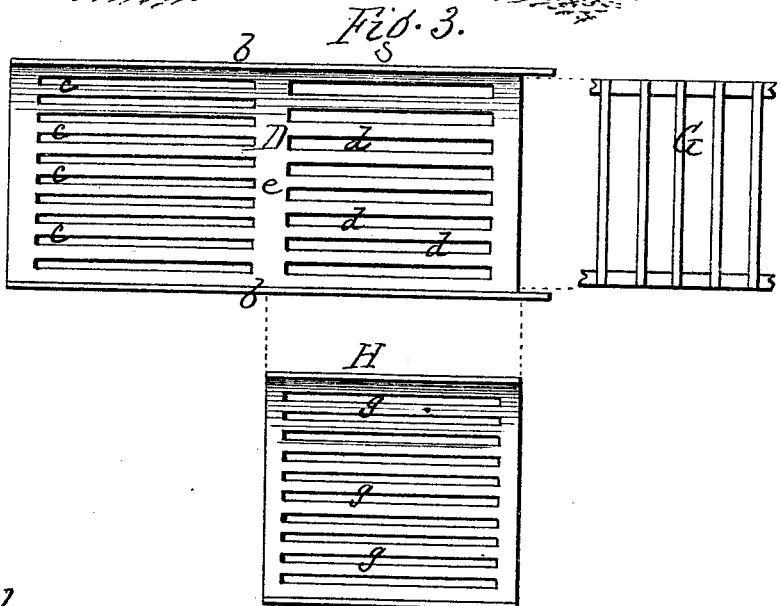
Witnesses.
E. D. Scott
N. Campbell
Inventor:
Frank N. Cole.
per R. F. Osgood.
Atty.
THE GRAPHIC CO. N.Y.

UNITED STATES PATENT OFFICE.

FRANK N. COLE, OF BARRE, NEW YORK.

IMPROVEMENT IN POTATO-HARVESTERS.

Specification forming part of Letters Patent No. 185,627, dated December 26, 1876; application filed March 31, 1876.

*To all whom it may concern:*

Be it known that I, FRANK N. COLE, of Barre, in the county of Orleans and State of New York, have invented a certain new and useful Improvement in Potato-Harvesters; and I do hereby declare that the following is a full, clear, and exact description of the construction and operation of the same, reference being had to the accompanying drawing, in which—

Figure 1 is a plan. Fig. 2 is a longitudinal vertical section. Fig. 3 is a diagram showing the relative arrangement of the screens and raddles.

My improvement relates to potato-harvesters in which screens and carriers are employed for elevating and sifting the dirt from the potatoes.

The invention consists in the construction and arrangement of parts, hereinafter more fully described.

A represents the main frame. B B B B are the supporting-wheels. The frame is hung under the axles of the wheels to bring the machine as low as possible. The front wheels turn loosely, but the rear wheels are made fast to the axle in order to impart motion to the belts or gearing. C is the scoop. It is of concave form in cross-section, and is rounding or convex at the point. This form is the most effective for entering and passing through the soil, and for directing the earth back upon the screen. The rear end of the scoop is hinged upon a rod, a, so as to turn freely, and the front end is adjusted up or down, to vary the depth of cut, by a lever or any equivalent arrangement.

D is the primary or upper screen. It is constructed with a flat bottom, e, and vertical sides b b, in trough shape. It stands inclined, as shown. At the top it joins with a discharge-plate, E, also of trough form, which inclines backward the other way, and serves to discharge the vines at the rear of the machine after the potatoes are separated.

The bottom of the plate E is made closed for this purpose. The bottom of the screen D is formed with a series of holes or slots, c c and d d. I prefer long slots extending longitudinally. The slots c c in the lower half are narrow enough to retain the smallest-sized potatoes, but allow the passage of dirt. The slots d d in the upper half are wide enough to pass the largest-sized potatoes, but prevent the passage of vines. G is the primary or upper carrier. It is constructed of slats attached to side belts. It passes around pulleys f f at top and bottom, and the upper length rests upon and in contact with the upper face of the slotted screen D. The slats carry up the earth, potatoes, and tops over the top of the screen. H is the lower screen. It is similar to the upper screen, but its perforations or slots g g are all narrow enough to prevent the passage of the smallest-sized potatoes. This screen stands on the same incline as the upper one, but it is of but half the length, and it lies directly under the coarser perforations or slots d d of the upper screen. I is the secondary or lower carrier. It passes round the second screen in the same manner. K is a box or receptacle for receiving the potatoes. It is situated at the rear of the machine and under the discharge-plate E. It is hung on bearings or pivots one side of the center, so as to retain its upright position. A little force applied on the swinging side will cause it to dump its load. L is a reel, resting over the rear end of the scoop. It consists of a shaft having bars k k, armed with teeth m m. The reel revolves forward, and, if desired, the teeth may curve or incline in the opposite direction to prevent catching and winding of the vines around the reel.

The parts may be operated by bands n n, or by gearing of any suitable kind.

The earth, with the potatoes or vines adhering, is taken up by the scoop, and carried back to the foot of the first carrier. The reel presses the vines down, and carries them to the machine, and also loosens up the mass, so that it will separate more readily in passing over the screen. The carrier elevates the mass, and as it passes up the dirt is sifted out through the narrow slots c c, leaving the potatoes and the vines upon the screen. As soon as the potatoes reach the coarse slots d d they all fall through onto the lower screen, while the vines are thrown over on the reverse inclined plate E, and discharged over the rear end of the machine. The potatoes, falling on the lower screen H, are carried up by the second carrier I, and discharged into the box K, and all dirt that remains with the potatoes after passing the first screen is sifted out in passing over the second screen.

A special feature consists in the employment of the supplementary screen and carrier H I beneath the main screen and carrier, resting only under the coarser perforations of the upper screen, whereby the potatoes are received and discharged into the box without being impeded by the vines above.

This device is more effective and will deliver the potatoes in a cleaner condition in the box than where a single screen alone is used, the vines being entirely removed before the potatoes finally fall.

I do not claim, broadly, a screen, nor an endless carrier; but

I claim—

In a potato-harvester, the combination, with the primary screen D and carrier G, of the supplementary screen H and its carrier I, located under the head of the upper screen and beneath the coarser perforations $d\ d$ of said screen, as shown and described, and for the purpose specified.

In witness whereof I have hereunto signed my name in the presence of two subscribing witnesses.

FRANK N. COLE.

Witnesses:
T. O. CASTLE,
EDWIN W. HARLOW.